United States Patent [19]

Carlson et al.

[11] 4,018,705

[45] Apr. 19, 1977

[54] REACTIVATION OF A SPENT LIQUID PHTHALOCYANINE CATALYTIC COMPOSITE

[75] Inventors: David H. J. Carlson, Park Ridge; Peter Urban, Northbrook, both of Ill.

[73] Assignee: Universal Oil Products Company, Des Plaines, Ill.

[22] Filed: May 19, 1975

[21] Appl. No.: 578,971

[52] U.S. Cl. ............................ 252/411 R; 208/206
[51] Int. Cl.² .................. B01J 31/40; C10G 19/02; C10G 19/08
[58] Field of Search .................. 252/411, 412, 414; 208/206, 207

[56] References Cited

UNITED STATES PATENTS

| | | | |
|---|---|---|---|
| 3,148,156 | 9/1964 | Henry | 208/206 |
| 3,371,031 | 2/1968 | Strong | 208/206 |
| 3,413,215 | 11/1968 | Beshears | 208/206 |
| 3,502,571 | 3/1970 | Stolfa | 208/207 |

*Primary Examiner*—Patrick P. Garvin
*Assistant Examiner*—P. E. Konopka
*Attorney, Agent, or Firm*—James R. Hoatson, Jr.; Raymond H. Nelson; William H. Page, II

[57] ABSTRACT

A spent liquid catalytic phthalocyanine composite is reactivated by a method which comprises percolating said spent liquid phthalocyanine composite through a bed comprising an absorbent compound, recovering the percolated liquid catalytic phthalocyanine composite, adding a solid metal phthalocyanine compound to the recovered percolated liquid phthalocyanine composite and recovering the reactivated liquid catalytic phthalocyanine composite for reuse in organic oxidation reactions.

13 Claims, 1 Drawing Figure

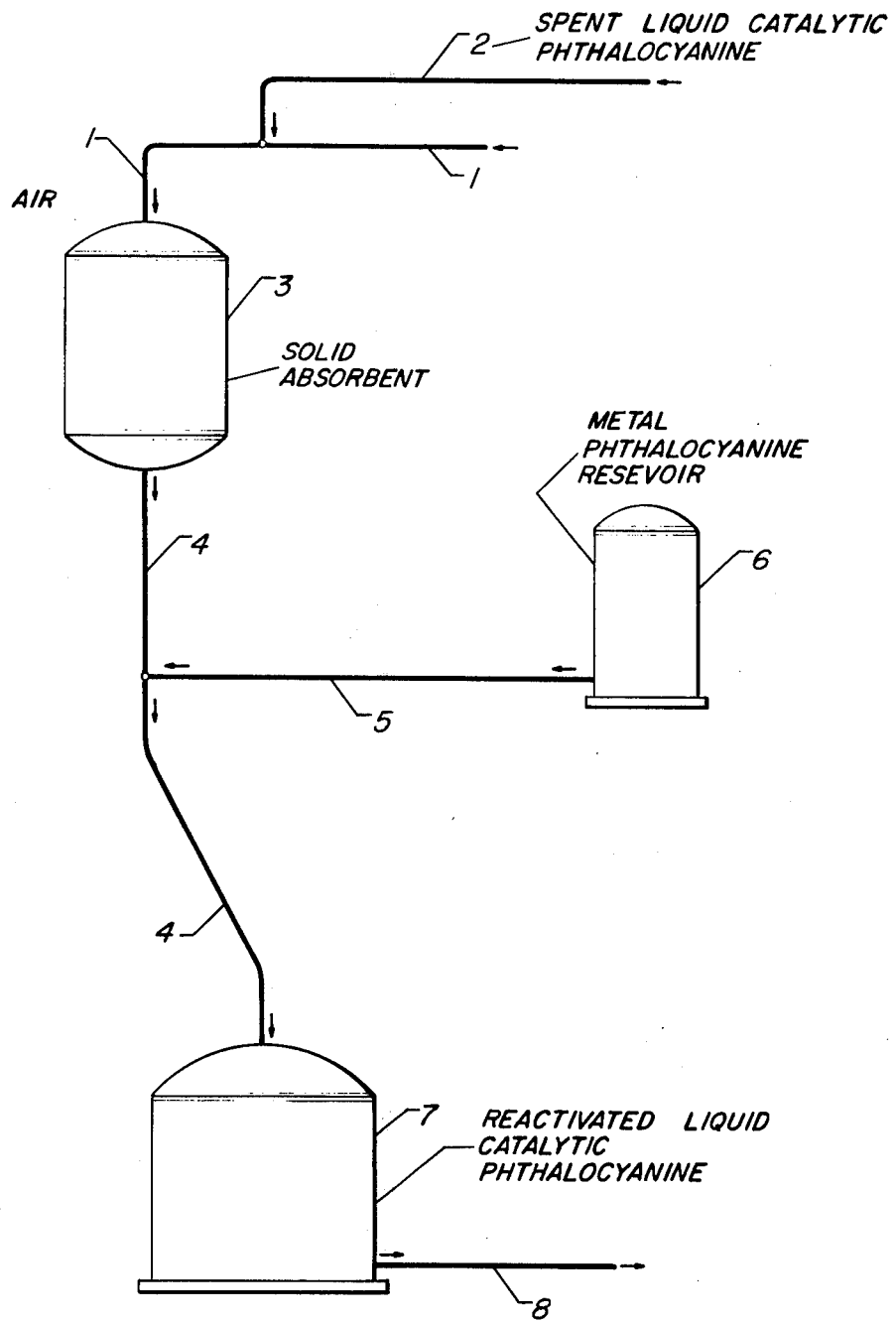

REACTIVATION OF A SPENT LIQUID PHTHALOCYANINE CATALYTIC COMPOSITE

This invention relates to a novel method of reactivating a spent liquid catalytic composite. More specifically, this invention relates to a method for reactivating a spent liquid catalytic phthalocyanine composite which comprises percolating said spent liquid catalytic phthalocyanine composite through a bed comprising an absorbent compound, recovering the percolated liquid catalytic phthalocyanine composite, adding a solid metal phthalocyanine compound to the recovered percolated liquid phthalocyanine composite and recovering the resultant reactivated liquid catalytic phthalocyanine composite.

Phthalocyanine catalysts are presently being used for the oxidation of acidic compounds. In one specific application of phthalocyanine catalysts, hydrocarbon streams and distillates containing unpleasant mercaptans are treated with air or another oxidizing gas in the presence of various phthalocyanine catalysts such as sulfonated cobalt phthalocyanine to convert the unpleasant mercaptans to disulfides. The hydrocarbon stream or distillate containing the mercaptans is classified as a "sour" stream and the treated substantially mercaptan-free stream or distillate is referred to in the industry as being a "sweet" hydrocarbon stream or distillate. It is known in the prior art that a pure mercaptan stream may be oxidized by treatment with air or oxygen in the presence of a metal phthalocyanine catalysts to produce disulfides. Other hydrocarbon streams or distillates which contain mercaptans may also be oxidized in the presence of the metal phthalocyanine catalysts by treatment with air or oxygen to reduce the mercaptan count thereof and produce a sweetened product. In current refinery practice the liquid-liquid treating systems of mercaptan compounds to disulfide compounds presents the problem of disposal of spent caustic. It is common refinery practice to add metal phthalocyanine to spent caustic to prolong the life of the caustic. Eventually this technique is no longer feasible as a result of the cost of metal phthalocyanine in comparison to activity it adds to the spent caustic. At this time the entire aqueous solution must be discarded which creates a loss of money to the refiner and an ecological problem to the environment. The method of rejuvenation of the spent liquid catalytic composite of the present invention will alleviate the aforementioned problems. While the metal phthalocyanine catalysts have been shown to have a particular advantage in the oxidation of mercaptans to disulfides, it should be understood that these catalysts may also be used for the oxidation of other compounds, specifically other organic compounds or mixtures, as, for example, the oxidation of hydrogen sulfide, cumene or derivatives thereof.

The desired rejuvenated catalysts of the method of this invention, namely, liquid phthalocyanine catalytic composites are utilized in the chemical industry in many ways. For example, metal phthalocyanine catalytic composites such as cobalt phthalocyanine dispersed in sodium hydroxide is utilized in the oxidation of a sour gas stream in the presence of oxygen or air to a sweet stream, said change in the stream's physical conditions occurring because of the oxidation of the sour mercaptans to the sweet disulfides. Liquid phthalocyanine catalytic composites are also effective in the oxidation of any other organic compound or mixtures thereof as, for example, the oxidation of cumene, pseudocumene, ethylbenzene, toluene, 2-methylcyclohexane, 1-isopropylcyclohexane, etc.

It is therefore an object of this invention to provide a method for the rejuvenation of liquid phthalocyanine catalysts or composites.

A further object of this invention is to provide a method for the rejuvenation of a spent liquid-catalytic composite utilizing certain absorbent compounds which will permit the recovery and reactivation of the desired liquid catalytic composite in a more expedient manner.

In one aspect an embodiment of this invention resides in a method of reactivating a spent liquid catalytic phthalocyanine composite which comprises percolating said spent liquid catalytic phthalocyanine composite through a bed comprising an absorbent compound, recovering the percolated liquid-catalytic phthalocyanine composite, adding a solid metal phthalocyanine catalyst to the recovered percolated liquid phthalocyanine composite at reactivation conditions, and recovering the resultant reactivated liquid catalytic phthalocyanine composite.

A specific embodiment of this invention resides in a method for reactivating spent cobalt phthalocyanine tetrasulfonate dissolved in a caustic media comprising sodium hydroxide which comprises percolating said spent cobalt phthalocyanine tetrasulfonate and sodium hydroxide through a bed of activated charcoal, said percolation being performed by aeration agitation in a down flow direction at a temperature of from about 200° C. to about 300° C. and a pressure of from about 1 atmosphere to about 50 atmospheres at a liquid hourly space velocity of from about 0.5 to about 10, adding a solid metal cobalt phthalocyanine tetrasulfonate compound to the recovered percolated liquid phthalocyanine composite and recovering the reactivated liquid catalytic composite comprising cobalt phthalocyanine tetrasulfonate dissolved in a sodium hydroxide medium.

Other objects and embodiments will be found in the following further detailed description of the present invention. As hereinbefore set forth the reactivated liquid composite is particularly applicable to the treatment of sour hydrocarbon streams or distillates including hydrocarbon gases, sour gasolines including crack gasoline, straight run gasoline, natural gasoline or mixtures thereof, naphtha, jet fuel, kerosines, aromatic solvents, stove oil, range oil, fuel oil, etc. In addition thereto, other hydrocarbon streams or distillates would include lubricating oils and various specialty oils. Still other sour substrates would include aqueous streams as for example, well water or other water streams containing hydrogen sulfide or mercaptans, or by the sour water effluents taken up in the aqueous stream as discharged from various industrial processes. However, regardless of any use in which the liquid-catalytic composite comprising the phthalocyanine catalyst is employed, the catalyst becomes deactivated and needs reactivation by the novel method of the present invention.

The liquid catalytic phthalocyanine composite used in the present invention may comprise any suitable metal phthalocyanine catalysts. The particular metals which are preferred of the phthalocyanines include cobalt phthalocyanine and vanadium phthalocyanine. Other metal phthalocyanines would include iron phthalocyanine, copper phthalocyanine, nickel phthalocyanine, chromium phthalocyanine, etc. The metal phthalocyanine is preferably used as a derivative such as a sulfonated derivative. Thus, the preferred phthalocyanine catalyst would comprise cobalt phthalocyanine tetrasulfonate. It is also contemplated within the scope of this invention that the catalysts comprise cobalt phthalocyanine monosulfonate and also cobalt phthalocyanine disulfonate. These catalytic compounds may be obtained from any suitable source or may be prepared in any suitable manner as, for example, by reacting cobalt phthalocyanine with fuming sulfuric acid. While sulfonic acids are particularly preferred it is understood that other suitable derivatives may be employed. Other derivatives would include the carboxylated derivative which may be prepared for example, by the action of trichloroacetic acid on a metal phthalocyanine or by the action of phosgene and aluminum chloride. In the latter reaction, the acid chloride is formed and may be converted to desired carboxylated derivative by conventional hydrolysis. A second element of the liquid-catalytic phthalocyanine composite comprises a caustic medium. The caustic medium may be afforded by any known caustic materials such as sodium hydroxide, potassium hydroxide, calcium hydroxide, rubidium hydroxide, strontium hydroxide, cesium hydroxide, barium hydroxide, francium hydroxide, lithium hydroxide, beryllium hydroxide, etc. It should be noted that the liquid catalytic phthalocyanine composite comprises the metal phthalocyanine dispersed in the liquid caustic solvent.

The absorbent compound which has the spent liquid catalytic phthalocyanine composite percolated in a down flow manner may be any known absorbent material such as activated charcoal or $\gamma$-alumina. The percolation of the spent liquid catalytic phthalocyanine composite may be performed by any manner of intermittent agitation upon the absorbent bed such as the use of forced air or nitrogen. The percolation through the absorbent bed may be defined as the contacting of two materials with a continuous gaseous phase.

Upon recovery of the percolated liquid catalytic phthalocyanine composite, it has been found necessary to charge a solid metal phthalocyanine compound to the recovered percolated liquid composite. The recharging of the composite or the percolation may be performed at reactivation conditions which include a temperature of from about 0° C. to about 300° C. and a pressure of from about 1 atmosphere to about 100 atmospheres. When superatmospheric pressures are employed, said pressure may be afforded by the introduction of a substantially inert gas such as nitrogen or helium to the reaction zone. The solid phthalocyanine compound which is charged to the percolating liquid may comprise any solid metal phthalocyanine compound but particularly metal phthalocyanines such as cobalt phthalocyanine, vanadium phthalocyanine, iron phthalocyanine, copper phthalocyanine, nickel phthalocyanine, chromium phthalocyanine, etc. The quantity of charge of the metal phthalocyanine compound will comprise from about 0.001 gram per 100 cc of the percolated composite to about 0.2 grams per 100 cc of the percoalted composite. It should be noted that the charged solid phthalocyanine compound does not have to be the same as the phthalocyanine compound of the spent liquid catalytic composite. The cobalt phthalocyanine disulfonate may be percolated through activated charcoal and subsequently charged with vanadium phthalocyanine disulfonate to form a reactivated liquid catalytic phthalocyanine composite. The rate of the above mentioned percolation may be described in terms of liquid hourly space velocity. The term liquid hourly space velocity is herein defined in the specification and appended claims to be the amount of liquid charged to the reaction zone per cubic volume of the absorbent compound. the liquid hourly space velocity of the process of this invention would include from about 0.5 to about 10. It is understood that the aforementioned spent liquid catalytic phthalocyanine composites, absorbent compounds, and solid phthalocyanine compounds are only representative of the class of compounds which may be employed, and that the present invention is not necessarily limited thereto.

After use in an oxidation reaction or process the liquid phthalocyanine composite becomes deactivated or spent. The extent of the deactivation will depend upon the particular charge being treated, the particular catalyst being used, the conditions of treatment and length of use of the composite. In many cases the treated product must meet a mercaptan specification and the catalyst is considered deactivated when the product no longer meets tnhe specification. When this occurs, the catalyst is considered to be spent and reactivation is necessary by the novel method of the present invention.

The process of this invention may be effected in any suitable manner and may comprise either a batch or continuous type of operation. For example, when a batch type operation is employed, the spent liquid catalytic phthalocyanine composite is charged through the bed comprising an absorbent compound of activated charcoal or $\gamma$-alumina by the noncontinuous aeration (the sporadic funneling of air through the absorbent compound bed) and recovered at the end of the absorbent bed as a percolated liquid catalytic phthalocyanine composite. The recovered product is subsequently charged with a solid metal phthalocyanine compound at conditions which include a temperature of from about 0° C. to about 300° C. and a pressure of from about 1 atmosphere to about 100 atmospheres. The end product is then recovered and analytically tested, said tests indicating a reactivated liquid catalytic phthalocyanine composite.

It is also contemplated within the scope of this invention that the reaction process for obtaining a reactivated liquid catalytic phthalocyanine composite may be effected in a continuous manner of operation. When such a type of operation is employed, the spent liquid catalytic phthalocyanine composite is sporadically charged to the bed comprising an absorbent compound by the noncontinuous aeration or noncontinuous charging of air to the bed of the absorbent compound. At the end of the absorbent bed, the percolated liquid catalytic phthalocyanine composite is recovered and charged to a mixing tank where a solid phthalocyanine compound is added to the percolated liquid phthalocyanine composite at reactivation conditions. The reactivation conditions include a temperature of from about 0° C. to about 300° C. and a pressure of from about 1 atmosphere to about 100 atmospheres. It should be noted that any spent liquid catalytic phthalocyanine composite which is recovered in the end product may be separated therefrom and recharged to the bed comprising an absorbent compound as a partial quantity of the charge stock comprising the spent liquid catalytic phthalocyanine composite.

Examples of suitable reactivated liquid-catalytic phthalocyanine composites which may be reactivated within the scope of this invention would include cobalt phthalocyanine tetrasulfonate in sodium hydroxide, cobalt phthalocyanine disulfonate in sodium hydroxide, cobalt phthalocyanine monosulfonate in potassium hydroxide, vanadium phthalocyanine tetrasulfonate in cesium hydroxide, vanadium phthalocyanine disulfonate in sodium hydroxide, vanadium phthalocyanine monosulfonate in potassium hydroxide, iron phthalocyanine, tetrasulfonate in sodium hydroxide, copper phthalocyanine disulfonate in sodium hydroxide, nickel phthalocyanine monosulfonate in sodium hydroxide, chromium phthalocyanine tetrasulfonate in sodium hydroxide, molybdenum phthalocyanine tetrasulfonate in calcium hydroxide, etc.

The attached drawing is merely intended as a general reputation of the flow scheme employed without intent to give details about heaters, condensers, pumps, compressors, valves, process control equipment, etc.

Referring now to the Drawing, spent liquid catalytic phthalocyanine composite in line 2 is charged to a solid absorbent 3 by means of line 1. The spent liquid catalytic phthalocyanine composite is percolated through the solid absorbent 3 by means of sporadic thrusts of air through line 1 to bed 3. The rate of air charge thru line 1 will determine the liquid hourly space velocity of the solid bed absorbent 3. The liquid hourly space velocity will range from about 0.5 to about 10.0. The percolated liquid catalytic phthalocyanine composite is withdrawn through line 4. The recovered percolated liquid composite is charged with a fresh solid metal phthalocyanine compound or compounds by means of line 5, which interconnects the recovered percolated liquid composite with the solid metal phthalocyanine reservoir 6. The liquid catalytic phthalocyanine becomes reactivated by the charge of the solid metal phthalocyanine from line 5 and it is recovered for reuse in recovery unit 7.

The following examples are given to illustrate the process of the present invention which, however, are not intended to limit the generally broad scope of the present invention in strict accordance therewith.

EXAMPLE I

In this example a portion of a caustic comprising sodium hydroxide containing toxin impurities and cobalt phthalocyanine tetrasulfonate was utilized to treat 225 grams of an FCC gasoline containing 240 ppm mercaptan in a liquid-liquid treating system. The system was run at a temperature of 23° C. and a pressure of 1 atmosphere as afforded by the introduction of air to the reaction system. The liquid-liquid system was run for a period of time comprising 5 minutes with continually stirring. After the 5 minute period of time the mercaptan content was found to be 77 ppm. This example shows that the caustic of the liquid-liquid system was spent or inactive.

EXAMPLE II

In this example a second aliquot portion of the spent liquid caustic comprising sodium hydroxide containing toxin impurities and cobalt phthalocyanine tetrasulfonate was percolated in a down flow direction through 100 cc of charcoal commonly known as Nuchar WA at a rate of 10 cc per minute. A total of 200 cc of spent caustic was charged to the charcoal bed and 140 cc of spent caustic was recovered after a period of time comprising 200 minutes. The percolated caustic was subsequently filtered through glass wool and utilized to treat a similar aliquot portion of FCC gasoline as used in Example I containing 240 parts per million mercaptan. The system was run in a liquid-liquid treating method at a temperature of 23° C. and a pressure of 1 atmosphere as afforded by the introduction of air to the reaction system. The liquid-liquid system was run for a period of time comprising 5 minutes with continual stirring. After the 5 minute period of time the mercaptan content was found to be 68 ppm. Example II shows that the percolation through the charcoal bed added to the activity of the spent liquid caustic in the treatment of the FCC gasoline, however, the increase in activity was not deemed sufficient to adequately aid in normal mercaptan removal.

EXAMPLE III

In this example a similar aliquot portion of spent liquid caustic utilized in Example I comprising sodium hydroxide containing toxin impurities and cobalt phthalocyanine tetrasulfonate was charged with an additional 100 weight ppm fresh cobalt phthalocyanine. The spent catalyst containing the fresh cobalt phthalocyanine metal was run in a liquid-liquid treating system to remove mercaptans from a similar aliquot portion of FCC gasoline as utilized in Example I containing 240 ppm mercaptan. The liquid-liquid treating system was run at a temperature of 23° C. and a pressure of 1 atmosphere as afforded by the introduction of air to the reaction system. The liquid-liquid treatment was run for a period of time comprising 5 minutes with continuous stirring. After the 5 minute period of time the mercaptan content was found to be 26 ppm. Example III shows that the charge of the metal phthalocyanine to the spent caustic increased the activity of the spent caustic, however, even the increase in catalyst activity to decrease the mercaptan content from 77 ppm of Example I to the 26 ppm of Example III is not deemed sufficient to adequately treat the mercaptan containing FCC gasoline in an adequate continuous treatment process.

EXAMPLE IV

In this example an aliquot portion of the caustic utilized in Example I comprising sodium hydroxide containing toxin impurities and cobalt phthalocyanine tetrasulfonate was percolated through 100 cc of charcoal commonly known as Nuchar WA at a rate of 10 cc per minute to effect the recovery of 140 cc of percolated caustic over a period of time comprising 200 minutes. The percolated caustic was subsequently filtered through glass wool and charged with 100 weight ppm of cobalt phthalocyanine. The caustic was then utilized in a liquid-liquid treating system at a temperature of 23° C. and a pressure of 1 atmosphere as afforded by the introduction of air to the reaction system. The liquid-liquid system was run for a period of time comprising 5 minutes with continual stirring. After the 5 minute period of time the mercaptan content was found to be 6.8 ppm, a value which rendered the FCC gasoline "doctor sweet."

The results of Example IV indicate the novelty of the present invention. In Example I the spent caustic was ineffective in the treatment of the FCC gasoline. In Examples II and III the caustic was only slightly improved by the charcoal bed of Example II and the fresh charge of metal catalyst in Example III. In Example IV, however, the FCC gasoline was rendered "doctor sweet" utilizing a combination of the percolation through the charcoal bed and the charge of fresh catalyst to the recovered percolated liquid composite.

EXAMPLE V

In this example a portion of a caustic comprising potassium hydroxide containing toxins and vanadium phthalocyanine tetrasulfonate is utilized to treat a kerosine charge stock containing thiophenol in a liquid-liquid treating system. The caustic which is previously tested and proven to be spent is percolated through a γ-alumina bed and charged with fresh vanadium phthalocyanine tetrasulfonate. The system is run at a temperature of 250° C. and a pressure of 50 atmospheres as afforded by the introduction of oxygen to the reaction system for a period of time comprising 5 minutes. After a period of time comprising the 5 minutes the kerosine is found to be "doctor sweet".

EXAMPLE VI

In this example a caustic containing calcium hydroxide which is previously proven to be ineffectual in the treatment of various mercaptans from a gasoline charge stock is treated by percolating the calcium hydroxide containing toxin impurities and molybdenum phthalocyanine tetrasulfonate in a down flow method through a charcoal treating bed. The recovered percolated calcium hydroxide is charged with fresh molybdenum phthalocyanine tetrasulfonate and utilized to treat the mercaptan-containing gasoline to a "doctor sweet" condition in 5 minutes.

We claim as our invention:

1. The method of reactivating a spent liquid phthalocyanine catalyst comprising a phthalocyanine of a metal selected from the group consisting of cobalt, vanadium, iron, copper, nickel and chromium dispersed in a liquid hydroxide of a metal selected from the group consisting of sodium, potassium, calcium, rubidium, strontium, cesium, barium, francium, lithium and beryllium, said catalyst having been deactivated during treatment of hydrocarbons wherein mercaptans are oxidized to disulfides, which process comprises percolating said liquid phthalocyanine catalyst through a bed of solid absorbent selected from the group consisting of activated charcoal and gamma alumina at a temperature of from about 0° C. to about 300° C. and a pressure of from about 1 atmosphere to about 100 atmospheres at a liquid hourly space velocity of from about 0.5 to about 10, thereafter adding to said liquid catalyst a solid phthalocyanine of a metal selected from the group consisting of cobalt, vanadium, iron, copper, nickel and chromium, and recovering the resultant reactivated phthalocyanine catalyst.

2. The method of claim 1 further characterized in that the metal phthalocyanine is in the form of a sulfonate.

3. The method of claim 1 further characterized in that the absorbent compound is activated charcoal.

4. The method of claim 1 further characterized in that the absorbent compound is γ-alumina.

5. The method of claim 1 further characterized in that the spent liquid catalytic phthalocyanine composite comprises cobalt phthalocyanine tetrasulfonate dissolved in a caustic medium comprising sodium hydroxide.

6. The method of claim 1 further characterized in that the spent liquid catalytic phthalocyanine composite comprises vanadium phthalocyanine tetrasulfonate dissolved in a caustic medium comprising potassium hydroxide.

7. The method of claim 1 further characterized in that the spent liquid catalytic phthalocyanine composite comprises molybdenum phthalocyanine tetrasulfonate dissolved in a caustic medium comprising calcium hydroxide.

8. The method of claim 1 further characterized in that the solid metal phthalocyanine is cobalt phthalocyanine tetrasulfonate.

9. The method of claim 1 further characterized in that the solid metal phthalocyanine is vanadium phthalocyanine tetrasulfonate.

10. The method fo claim 1 further characterized in that the solid metal phthalocyanine is molybdenum phthalocyanine tetrasulfonate.

11. The method of claim 1 further characterized in that the resultant reactivated phthalocyanine catalyst is cobalt phthalocyanine tetrasulfonate dissolved in a caustic medium comprising sodium hydroxide.

12. The method of claim 1 further characterized in that the resultant reactivated phthalocyanine catalyst is vanadium phthalocyanine tetrasulfonate dissolved in a caustic medium comprising potassium hydroxide.

13. The method of claim 1 further characterized in that the resultant reactivated phthalocyanine, catalyst is molybdenum phthalocyanine tetrasulfonate dissolved in a caustic medium comprising calcium hydroxide.

* * * * *